116,912

UNITED STATES PATENT OFFICE.

CHARLES ALDEN, OF NEWBURG, NEW YORK.

IMPROVEMENT IN FRUIT JELLIES.

Specification forming part of Letters Patent No. 116,912, dated July 11, 1871.

*To all whom it may concern:*

Be it known that I, CHARLES ALDEN, of Newburg, in the county of Orange and State of New York, have invented a new and useful Improvement in Making Fruit Jellies; and I do hereby declare the following to be a full, clear, and exact description thereof, which will enable those skilled in the art to make and use the same.

This invention is based on the discovery that by treating fruit, such as apples, peaches, tomatoes, grapes, &c., according to a process described in reissued Letters Patent No. 4,011, granted to me June 7, 1870, the saccharine matter contained in said fruit is increased in amount, said process being, so to speak, a continuation of the ripening process of the fruits; and my present invention relates to jellies from various fruits or parts of fruits, produced by first evaporating the water from such fruits and soaking them or portions of them in a suitable quantity of water, then drawing off the juice and adding more water and repeating the operation first with the same, and then with a new quantity of fruit, until the liquor has obtained the requisite degree of strength, when it is concentrated in a vacuum or other pan to the required jelly thickness.

In carrying out my invention, first I evaporate the water from the fruit, as described in my patent above mentioned, then I provide four (more or less) cylinders or vessels, each large enough to receive about one hundred pounds of the fruit from which the jelly is to be prepared. These vessels I will designate 1 2 3 4. I then take one hundred pounds of the cores and skins, or of any other part of the fruit from which the jelly is to be made, put them in vessel No. 1, and soak them in about one hundred pounds of water or in water enough to cover them for the term of about twelve hours, whereby a portion of the strength or juice of the fruit is exhausted. This juice is drawn off and poured over the second one hundred pounds of fruit contained in vessel No. 2, which fruit is soaked and exhausted the same as the quantity contained in vessel No. 1. In the mean time water is again added to the first one hundred pounds and soaked for about twelve hours. The juice of No. 2 is then exhausted and added to No. 3, and the second juice from No. 1 is added to No. 2, and more water is added to No. 1; the juice of vessel 3 is poured into vessel 4, the second juice of No. 2 into No. 3, and the third juice of No. 1 into No. 2. The strength of the fruit in vessel No. 1 having been by this time completely exhausted, this vessel is emptied and a fresh quantity of fruit is introduced therein, and the first juice from vessel No. 4 is poured in No. 1, and that process is thus continued as long as may be desirable. After the contents of the last vessel have been fully exhausted the liquor is concentrated in a vacuum-pan or by any other suitable means—by preference, without boiling—to the required jelly thickness.

A jelly prepared from fruit, as above described, retains all the original flavor of the fruit and has a much richer taste than jellies made in the usual manner, the taste not being destroyed by boiling, or by the addition of sugar or any other ingredient.

The residuum obtained by treating fruit in the manner above described I use for preparing fruit marmalades by separating from said residuum the hulls and seeds.

What I claim as new, and desire to secure by Letters Patent, is—

1. A jelly, made from fruit or parts thereof from which the moisture has been evaporated, substantially as herein set forth.

2. The within-described process for producing jellies from fruits or parts thereof by treating the same substantially in the manner herein described.

3. A fruit marmalade, made from the residuum obtained from treating fruit substantially in the manner above described.

CHARLES ALDEN.

Witnesses:
W. HAUFF,
E. F. KASTENHUBER.